United States Patent
Stockman et al.

(10) Patent No.: US 6,313,978 B1
(45) Date of Patent: Nov. 6, 2001

(54) FLUID-FILLED CAPACITOR WITH PRESSURE INTERRUPTER MEANS AND INTERNAL COMPRESSIBLE AIR CHAMBER

(75) Inventors: Robert M. Stockman, Palm Coast; Richard W. Stockman; Dean T. Zacherl, both of Ormond Beach, all of FL (US)

(73) Assignee: American Radionic Co., Inc., Palm Coast, FL (US)

( * ) Notice: Subject to any disclaimer, the term of this patent is extended or adjusted under 35 U.S.C. 154(b) by 0 days.

(21) Appl. No.: 09/477,846

(22) Filed: Jan. 5, 2000

(51) Int. Cl.⁷ .............................. H01G 2/00; H01G 2/12; H01G 2/22; H01G 4/255; H01G 5/019
(52) U.S. Cl. ................... 361/272; 361/314; 361/301.5
(58) Field of Search ................................ 361/272, 273, 361/275.1, 275.2, 275.3, 275.4, 301.5, 307, 311, 312, 313, 314, 315, 323

(56) References Cited

U.S. PATENT DOCUMENTS

| | | | |
|---|---|---|---|
| 3,909,683 | * 9/1975 | Kysely | 361/272 |
| 4,209,815 | * 6/1980 | Rollins et al. | 361/15 |
| 4,639,827 | * 1/1987 | Strange et al. | 361/272 |
| 4,748,536 | * 5/1988 | Robinson | 361/272 |
| 5,019,934 | 5/1991 | Bentley et al. | |
| 5,148,347 | 9/1992 | Cox et al. | |
| 5,381,301 | 1/1995 | Hudis | |

* cited by examiner

*Primary Examiner*—Dean A. Reichard
*Assistant Examiner*—Eric W. Thomas
(74) *Attorney, Agent, or Firm*—Ware, Fressola, Van der Sluys & Adolphson LLP

(57) ABSTRACT

A capacitor has a polymer housing and a wound metallized film capacitive element received in the housing, with leads connected to terminals on the cover of the housing through a pressure responsive interrupter assembly. An air chamber is provided in the housing, confining a compressible volume of air, and insulating fluid fills the remaining volume of the housing, substantially immersing the capacitive element. The air chamber is advantageously defined by a piston slidably mounted in the housing. Upon a high pressure condition caused by failure of the capacitive element, the volume of air is compressed to cushion the onset of the high pressure, protecting the case from rupture prior to operation of the pressure responsive interrupter assembly.

35 Claims, 6 Drawing Sheets

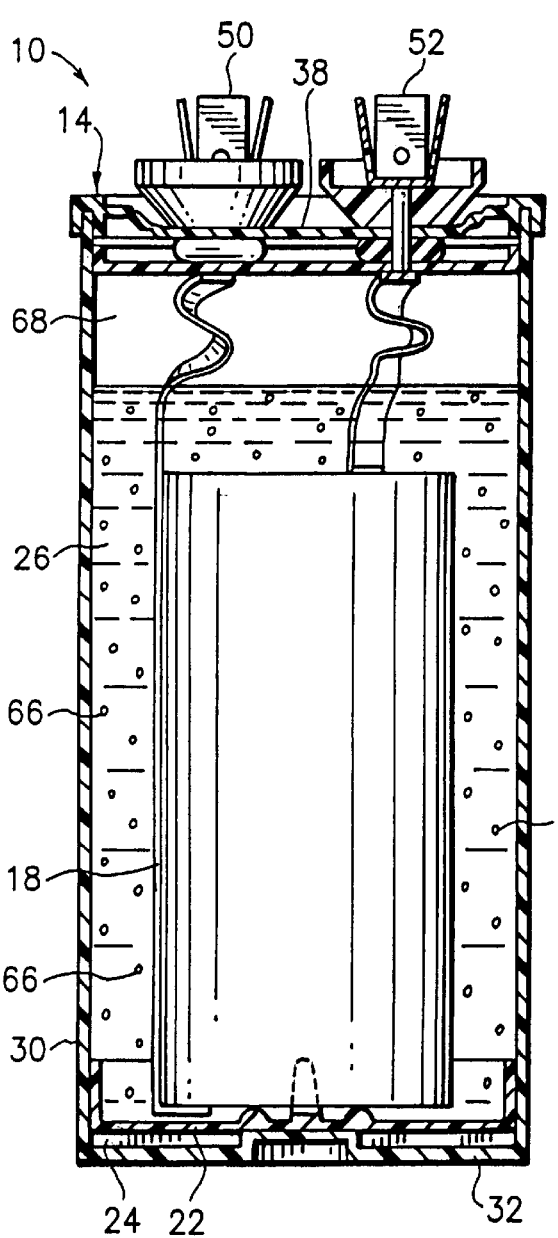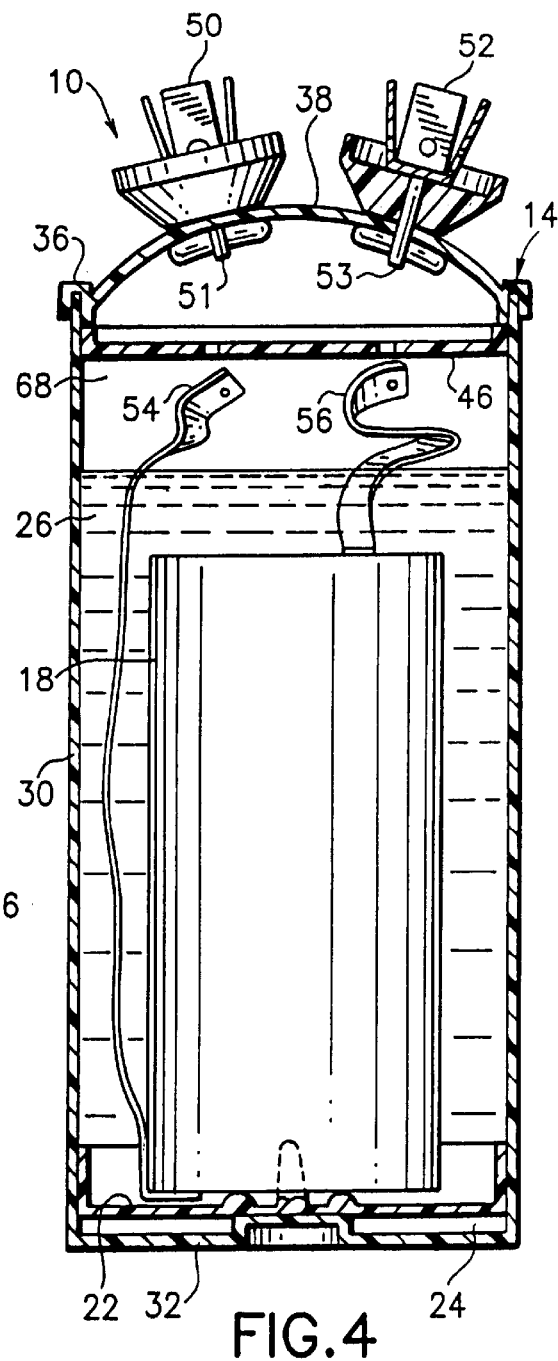

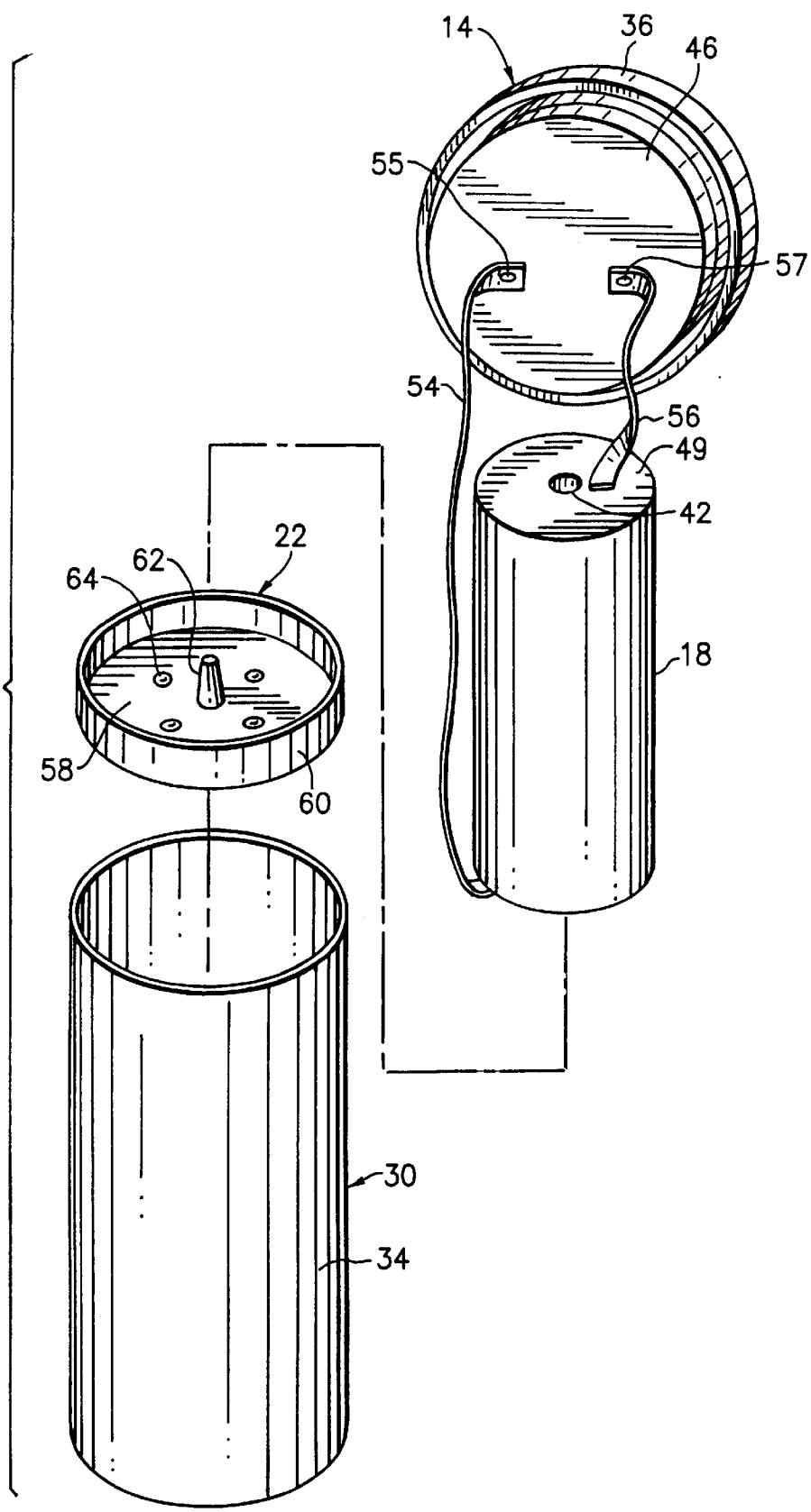

FLUID-FILLED CAPACITOR WITH PRESSURE INTERRUPTER MEANS AND INTERNAL COMPRESSIBLE AIR CHAMBER

FIELD OF INVENTION

The invention herein relates to a capacitor having a capacitive element in a housing and insulating fluid surrounding the capacitive element, a pressure responsive interrupter means, and a volume of compressible air confined within the housing which facilitates operation of the pressure responsive interrupter means.

BACKGROUND OF INVENTION

Capacitors of the type typically used in motor run applications have a housing and a capacitive element of wound polymer film within the housing. The housing is at least partially filled with an insulating fluid. The capacitive element is connected to terminals on the exterior of the housing, and a pressure responsive interrupter system is associated with the terminals and conductors connecting the capacitive element with the terminals. If the capacitive element fails, it may do so in a sudden and violent manner, producing heat and out-gassing such that high internal pressures are developed within the housing. The pressure responsive interrupter system is designed to break the connection between the capacitive element and the terminals in response to the high internal pressure, thereby removing the capacitive element from a circuit and stopping the high heat and over-pressure condition within the housing before the housing ruptures.

The housings have often been constructed of metal, with the terminals and pressure responsive interrupter system on a metal cover of the metal housing. It had always been assumed that metal enclosures were necessary for strength, due to the high internal pressures that are developed within the housings during a fault or run-away defective condition, and due to the force required to lift or bend the metal cover to insure disconnection of the capacitor terminals from the internal capacitive element. However, in recent years capacitors with plastic housings have appeared on the market, including pressure responsive interrupter systems that operate by bending or lifting a plastic cover. Typical capacitors with plastic enclosures are shown in U.S. Pat. Nos. 5,019,934, 5,148,347 and U.S. Pat. No. 5,381,301.

In order to insure that the pressure responsive interrupter systems of plastic housing capacitors perform consistently and reliably, it was found necessary to underfill the housings with insulating fluid, leaving a substantial amount of air within the capacitor housing. The additional air is believed to act as a cushion during the violent, uncontrolled reaction that takes place when sudden failure of the capacitor is induced by the rigorous standards of UL testing, and similar reaction can take place when the capacitor fails under real-world situations. When the capacitor housing is entirely or nearly filled with insulating fluid, the plastic housing tends to rupture, but when the housing is partially filled with insulating fluid, the plastic housing is able to maintain integrity while the pressure responsive interrupter system operates in its intended manner.

However, one of the major drawbacks of leaving air space in this type of capacitor is that the capacitive element may not be totally immersed in the insulating fluid. This is especially true if the capacitor is mounted in a horizontal position or in an inverted position, and inverted mountings are becoming increasingly popular. When the insulating fluid does not fully cover the capacitor element, at least a portion the end spray area of the capacitive element is exposed to the air and possible development of corona, leading to capacitor degradation. Additionally, the capacitive element tends to generate heat during use, and the heat is best dissipated through the surrounding insulating fluid. When areas of the capacitive element are not covered by fluid, they develop excessive heat which has a deleterious effect on long term capacitor performance. Typically, there is a reduction in capacitance value to below acceptable limits, an increase in dissipation factor which indicates internal arcing, and eventual separation of end spray material. This excessive capacitive loss and increase in dissipation factor will usually result in a runaway failure mode, with the sudden and violent reaction requiring successful operation of the pressure responsive interrupter system.

Nevertheless, a capacitor with a plastic housing has certain advantages over a capacitor with a metal housing. These advantages include lower costs, and the insulating properties of a plastic housing compared to the conductive properties of a metal housing. Overcoming the drawbacks of the prior capacitors with plastic housings would therefore be an advance in the art.

SUMMARY OF THE INVENTION

It is a principal object of the invention herein to provide an improved, fluid-filled capacitor.

It is also an object of the invention herein to provide a fluid-filled capacitor with a plastic housing.

It is an additional object of the invention to provide a fluid-filled capacitor in which the capacitive element is substantially fully immersed in fluid.

It is another object of the invention to provide a fluid-filled capacitor in which the pressure responsive interrupter system operates reliably before rupture of the housing.

In carrying out the invention, there is provided a capacitor with a housing having a case and a cover, the cover having terminals thereon for connecting the capacitor in the electrical circuit. A capacitive element is received in the housing and connected with the terminals. A pressure responsive interrupter means is associated with the capacitive element, cover and terminals for breaking the connection between the capacitive element and the terminals upon a high pressure condition in the housing. Air chamber defining means confines a compressible volume of air within the housing, and an insulating fluid is provided within the housing substantially surrounding the capacitive element. The air in the air chamber defining means is compressed upon a high pressure condition within the housing caused by failure of the capacitive element, which cushions the high pressure condition prior to operation of the pressure responsive interrupter means.

According to further aspects of the invention, the housing is fabricated of plastic. Also, a plastic cover of the housing bends outwardly to break the connection between at least one terminal and the capacitive element within the housing.

According to additional aspects of the invention, the air chamber defining means includes a piston slidingly and sealingly engaged with the side wall of the housing to confine a volume of air, and the piston may be displaced to compress the volume of air. Further, the piston may be positioned adjacent a bottom end of the housing, opposite the cover. The piston may include a center shaft for centering and elevating the capacitive element within the housing, creating space for insulating fluid adjacent one end of the capacitive element.

According to further aspects of the invention, the volume of air in the air chamber defining means, prior to compression of the air therein, occupies about 15% to about 40% of the volume of the housing, and desirably about 25–30% of the volume. This aspect of the invention is advantageously carried out in a cylindrical housing of approximately 4 inches in length and 2 inches in diameter, having a piston defining an air chamber approximately ⅜ inch to 1½ inches in length, and preferably about ¾ inch in length.

According to other aspects of the invention, the air chamber defining means is flexible film positioned within the housing and defining one or more air pockets.

In further carrying out the invention, operation of the pressure responsive interrupter means is facilitated by confining a compressible volume of air in the housing. Further, the compressible volume of air displaces the fluid so that the capacitive element is substantially immersed in the fluid.

Other and more specific objects and features of the invention will in part be recognized by those skilled in the art and will in part appear in the following description of the preferred embodiments and claims, taken together with the drawings.

BRIEF DESCRIPTION OF DRAWINGS

FIG. 3 is a side view, substantially in section, of the capacitor in FIG. 2 with its capacitive element in a failure mode;

FIG. 4 is a side view, substantially in section, of the capacitor of FIG. 2 after operation of the pressure responsive interrupter means;

FIG. 5 is an exploded perspective view of the capacitor of FIG. 2, without fluid;

The same reference numerals refer to the same elements throughout the various Figures. The drawings are not to any particular scale.

DESCRIPTION OF PREFERRED EMBODIMENTS

Figure 1:
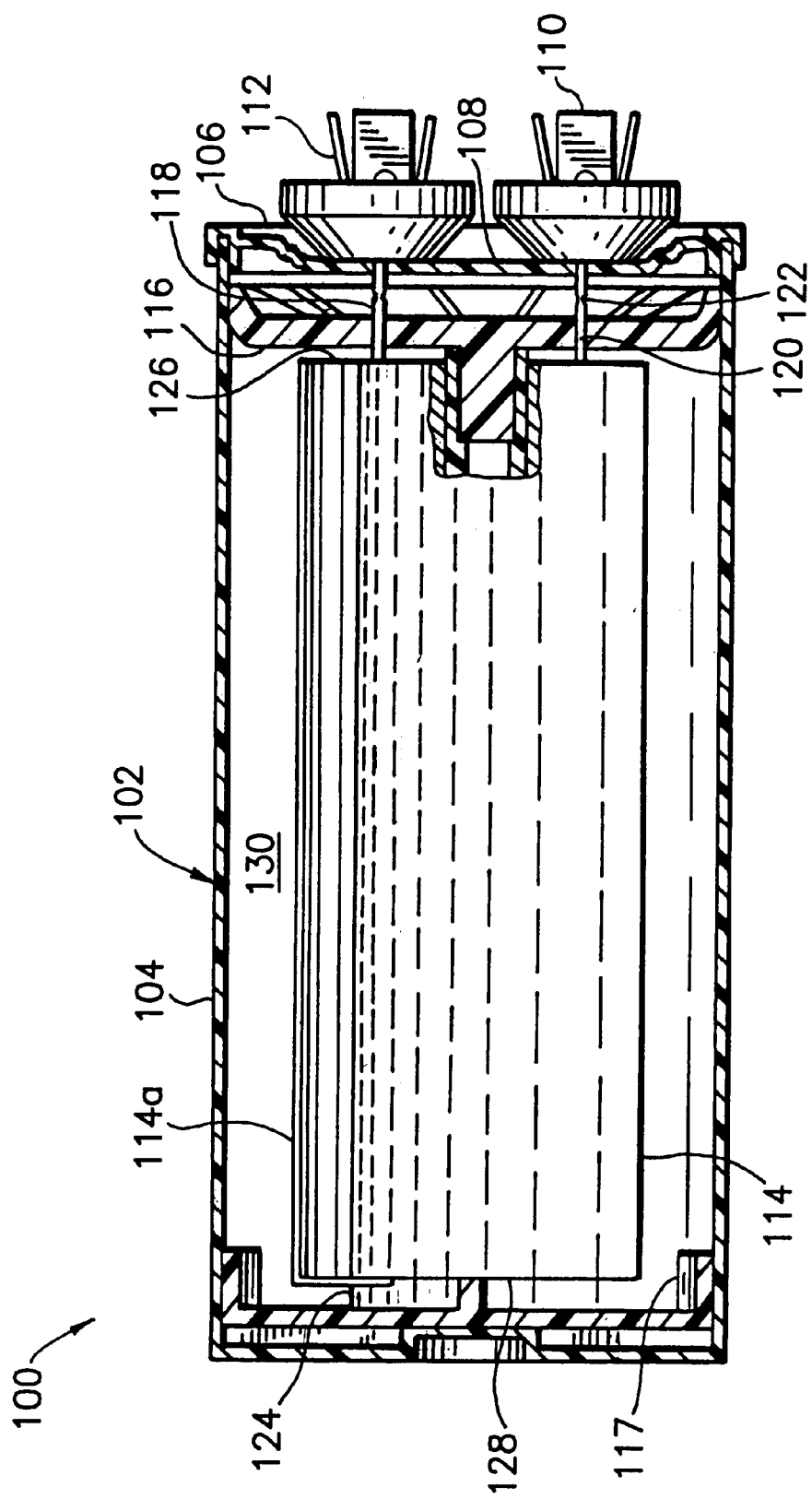
FIG. 1 is a side view, substantially in section, of a prior art fluid-filled capacitor, deployed horizontally.
Figure 2:
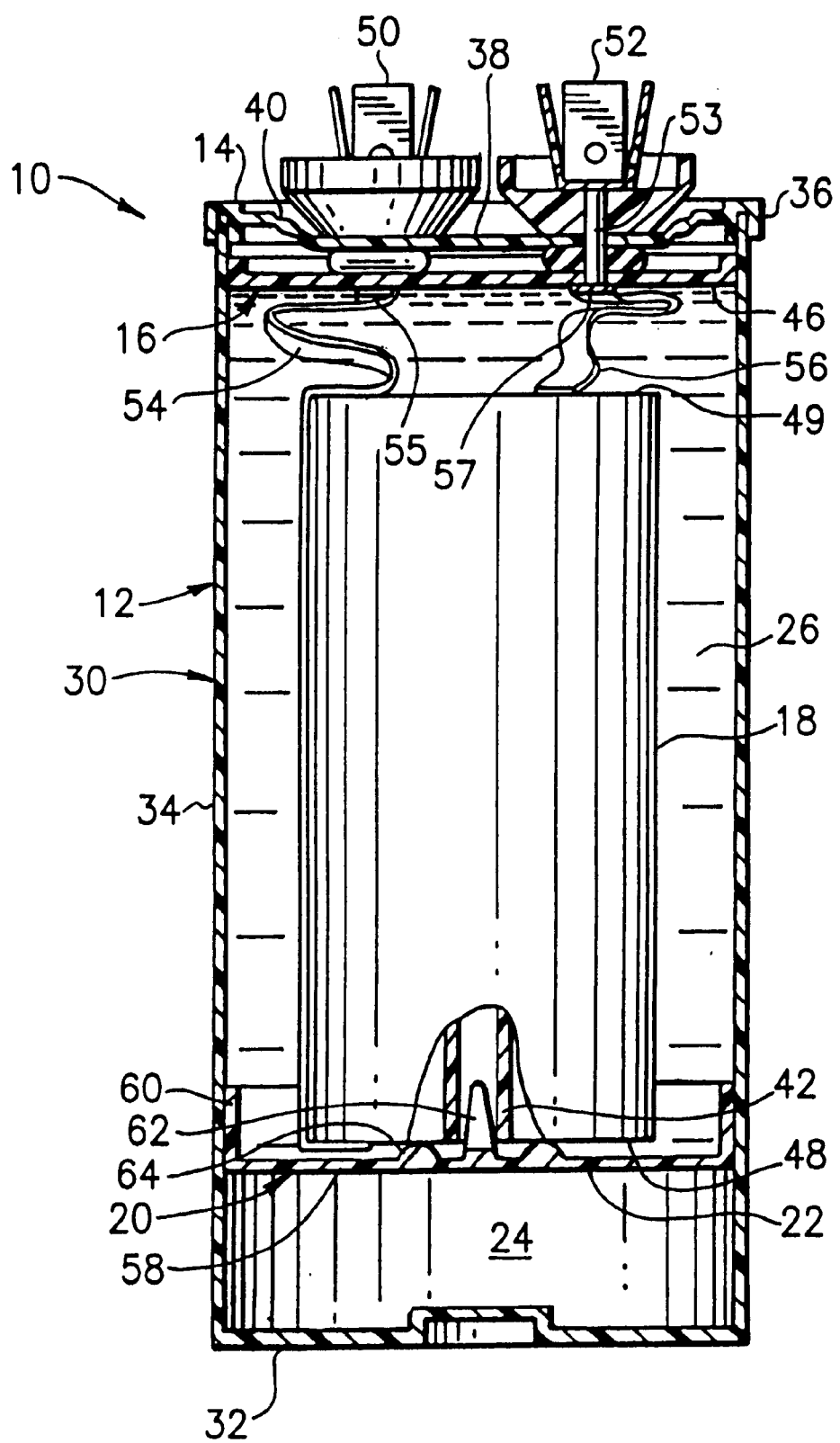
FIG. 2 is a side view, substantially in section, of a fluid-filled capacitor according to the invention herein.

With reference to FIG. 1, there is shown a prior art capacitor 100 deployed on its side in a horizontal position, as it may be installed. The prior art capacitor 100 comprises a polymer housing 102 having a cylindrical case 104 and a cover 106. The cover 106 has a recessed central panel 108, on which terminals 110 and 112 are mounted.

A capacitive element 114 is positioned in the case 104, and is spaced from the cover 106 by a top retainer 116 so that the capacitive element is held down with respect to the cover. A spider 117, which is not liquid-tight with respect to the case 104, centers the opposite end of the capacitive element 114. The capacitive element is connected to the terminals via wire leads 118 and 120, wire lead 120 being substantially in tension and nicked at 122 to provide a weak point. The combination of the nicked wire lead, the recessed cover panel 108 and the top retainer 116 form a pressure responsive interrupter system for the capacitor 100. Upon an over pressure condition in the housing, the center panel 108 of the cover 106 will lift outwardly, breaking the wire lead 120 at the nick 122.

The capacitor 100 includes an insulating fluid 124 which does not fully fill the interior of the housing 102. When the capacitor 100 is installed in the horizontal position, as shown, an upper portion 114a of the capacitive element 114 and portions of the end faces 126 and 128 are exposed in air space 130. However, fully filling the capacitor 100 with fluid has not been feasible, because a sudden and violent over pressure condition caused by failure of capacitive element 114 tends to rupture the housing 102 before the pressure responsive interrupter system can break the electrical connection to the capacitive element and stop the out-gassing caused by failure of the capacitive element. Thus, the capacitor 100 is prone to short life due to corona effect at the ends of the capacitive element and to sub-optimal heat transfer from the capacitive element through the insulating fluid, and may suffer progressive degradation of performance before failing.

The air space 130 created by only partially filling the housing 102 with insulating fluid is believed to provide a cushioning effect which prevents rupture of the housing due to sudden and violent pressure increases, but nevertheless permits the pressure responsive interrupter system to operate. Thus, the prior art capacitor 100 sacrifices some performance and longevity for satisfactory pressure interruption.

With reference to FIGS. 2–5, capacitor 10 according to the invention herein generally comprises a housing 12, including a cover 14 forming part of a pressure responsive interrupter system generally indicated at 16, and a capacitive element 18. A compressible volume of air 24 is provided within the housing, confined by air chamber defining means 20 in the form of a piston 22. The capacitive element is substantially fully immersed in insulating fluid 26. The capacitor 10 according to the invention has both the longevity and enhanced performance resulting from substantially fully surrounding the capacitive element with insulating fluid, and also avoids rupture of the housing prior to operation of the pressure responsive interrupter system.

With continued reference to FIGS. 2–5, the housing 12 has a cylindrical case 30 having a bottom wall 32 and cylindrical side wall 34 upstanding therefrom. The cover 14 has a peripherally grooved rim 36 ultrasonically welded to the upper end of the side wall 34. The cover 14 also has a recessed center panel 38, which is connected to the rim 36 by annular ring 40 having thinner, flexible connecting positions therebetween so that the center panel 38 can lift and bow outwardly as a result of internal pressure, as shown in FIG. 5. The cover is therefore part of the pressure responsive interrupter system, generally indicated at 16, which also includes a rigid brace panel 46 positioned to engage the cover rim 36. Terminals 50 and 52 are mounted to the recessed center panel 38 of cover 14 and have terminal posts 51, 53, respectively, that extend through the brace panel 46 to connect with the capacitive element 18 as more fully described below. This pressure interrupter system is presently in widespread use in capacitors with metal housings, as are minor variations of it.

The capacitor 10 includes capacitive element 18, which is typically a cylinder of wound layers of metallized film having offset edges that are sprayed with a metal alloy to form end faces 48 and 49. Conductive lead 54 connects the bottom end face 48 of the capacitive element 18 with the terminal post 51 at 55 on the underside of the brace panel 46, and conductive lead 56 connects the upper end spray to the terminal post 53 of terminal 52 at 57, also on the underside of the brace panel 46. The capacitive element 18 may be formed of metallized polypropylene film, and the methods of winding and end spraying capacitive elements are well known in the art.

The piston 22 includes a face plate 58 having an annular skirt 60 closely received against the side wall 34. The face plate 58 is spaced apart from the bottom wall 32 of the case 30, to confine the volume of air 24 therebetween.

The capacitive element 18 is positioned in the housing 12 above the piston 22 and air volume 24, and is substantially fully immersed in insulating fluid 26. The interface between the skirt 60 and sidewall 34 is sufficient to seal the insulating fluid 26 from entering the air volume 24. In the embodiment shown, insulating fluid 26 is of relatively high viscosity, and is preferably a polyurethane oil insulating fluid as described in U.S. Pat. No. 6,014,308, or may be polybutene or other known insulating fluids.

The capacitive element is centered in the fluid by means of a shaft 62 upstanding from the piston 22, the shaft 62 being received in a tubular mandrel 42 of the capacitive element 18. The shaft 62 and dimples 64 space the capacitive element with respect to the piston face 58 so that insulating fluid is present adjacent the end face 48. Thus, the capacitive element is fully immersed in the insulating fluid 26 and, stated alternatively, the insulating fluid substantially fully surrounds the capacitive element. Yet, a volume of air 24 is confined within the capacitor housing by the air chamber defining means 20, namely the piston 22 and cooperating portions of the case 30. The air 24 does not contact the capacitive element 18, but instead displaces the insulating fluid 26 to achieve full immersion of the capacitive element 18.

It will also be understood that when reference is made to the volume of "air" 24, the air can alternatively be another gas, such as nitrogen, and that for purposes of the specification and claims herein the term "air" is to be considered as embracing individual gases or other mixtures of gases. Air is the most convenient mixture of gases because no special gas filling step is required in assembling the capacitor 10, and air provides satisfactory operation of the capacitor 10.

From the foregoing discussion it will be apparent that the capacitor 10 is manufactured by sliding the piston 22 into the cylindrical case 30 to a position spaced apart from the bottom wall 32, thereby confining the volume of air 24 in the defined air chamber. With particular reference to FIG. 5, the capacitive element 18 and its leads 54 and 56 are inserted in the cylindrical case 30. Thereafter, the fluid 26 is introduced therein, and the cover 14, including the brace panel 46 of the pressure responsive interrupter system, is placed on the upper end of the cylindrical case 30 and is secured thereto by ultrasonic welding.

In the capacitor 10 shown, the case 30 and cover 14 making up the housing 12 are preferably made of Noryl® polymer (a polyphenylene and polysterene), and the piston is preferably PVC polymer. The housing has a diameter of about 2 inches (5 cm) and a height of about 4 inches (10 cm). The face plate 58 of piston 22 is spaced from the bottom wall 32 by about ¾ inch (2 cm). The capacitive element has a volume of about 4 to 4½ cubic inches (65–75 cubic cm), so that the air volume prior to compression is about 25–30% of the available volume in the housing, the remainder being filled with insulating fluid 26. The capacitive element is rated 25 micro farads at 370 volts. The piston face may be spaced from the bottom wall by as little as ¼ inch (0.6 cm) and by as much as 2 or more inches (5 or more centimeters), provided that the pressure responsive interrupter system 16 works in combination with a particular capacitive element without rupture of the housing. The air volume 24 may occupy from about 10% to about 40% of the available volume within the housing, after insertion of the capacitive element 18. For housings of different sizes or materials, or for different particular capacitive elements, the volume of the air may be adjusted until desired operation is achieved.

It will also be appreciated that the capacitor or housing may be made of other plastics, or may also be made of metal thinner than the metal used in housings of prior art capacitors because of the advantage of the confined, compressible air volume 24 brings to operating the pressure responsive interrupter system without rupture of the housing.

With reference to FIG. 3, the capacitor 10 is shown in the early stages of failure of the capacitive element 18. When the capacitive element 18 fails from a short, there is a tendency for the capacitive element to out-gas, i.e., produce quantities of gas, as illustrated by bubbles 66 emanating from the capacitive element 18 and collected at 68 near the cover of capacitor 10. The out-gassing is often a sudden and violent event, which rapidly raises the pressure within the housing 12 to an over pressure condition. As the gas from the failed capacitive element accumulates in the housing, it causes the volume of air 24 to compress by pushing the piston 22 toward the bottom 32 of the case 30. In FIG. 3, the piston 22 is pushed down to a position adjacent the bottom wall 32. Thus, the sudden onset of high pressure in the housing 12 is absorbed and cushioned by compression of the air volume 24. The piston may be pushed down only part way toward the bottom wall, depending on the nature of the failure of the capacitive element. Also, some of the air 24 may leak past the piston 22 as the piston is driven downwardly, but the air is still present within the housing 12 and available for compression as a cushion against the onset of high pressure from failure of the capacitive element.

With reference to FIG. 4, the continued out gassing of the failed capacitive element 18 operates the pressure responsive interrupter system 16 to electrically disconnect the capacitive element 18. This occurs when the recessed center panel 38 of the cover is displaced to bow outwardly, pulling the terminal posts 51 and 53 away from the brace panel 46. The ends of the leads 54 and 56 remain below the brace panel 46, and are thereby separated and disconnected from the terminal posts 51 and 53. When the capacitive element 18 is disconnected, the out-gassing stops with the housing 12 intact. The over pressure condition may partially subside when the capacitor cools after being disconnected, but the pressures are generally still high and maintain the piston 22 depressed toward or near the bottom wall 32.

Figure 6:
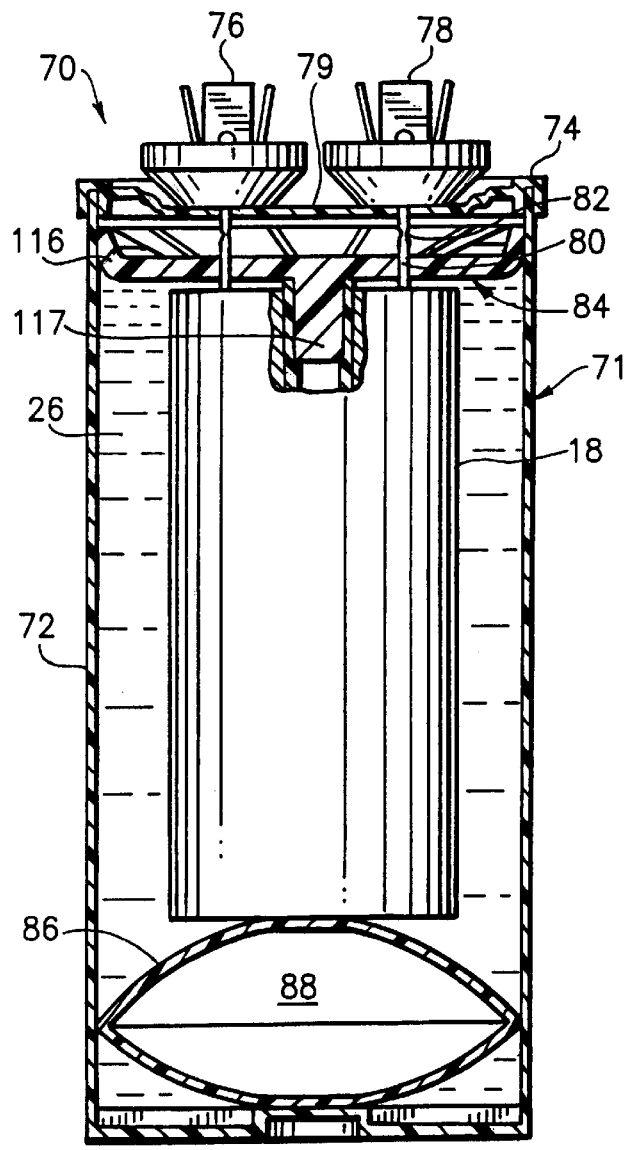
FIG. 6 is a side view, substantially in section, of another fluid-filled capacitor according to the invention herein.

With reference to FIG. 6, another capacitor 70 according to the invention herein is illustrated. It generally comprises a housing 71 including a cylindrical case 72 and a cover 74. The cover 74 may be the same as or similar to the cover 14 described above, and has terminals 76 and 78 mounted on a recessed center panel 79 thereof.

A capacitive element 18 is positioned within the housing on top retainer 116, the top retainer 116 being secured against the periphery of the cover and including a central shaft 117 secured in the mandrel 42 of the wound capacitive element 18 to restrain the capacitive element from movement toward the cover 74. The capacitive element is connected to the terminals by wire leads, at least one lead 80 being nicked at 82 and having little or no slack between the capacitive element 18 and the terminal 78. Thus, the capacitor 70 has a pressure responsive interrupter system 84 consisting of the cover 74, the top retainer 116 and the nicked wire 80 which will break when the cover 74 bows outwardly due to over pressure condition within the capacitor housing.

Figure 7:
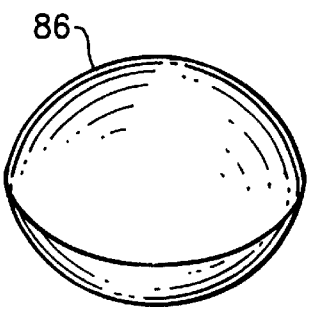
FIG. 7 is a perspective view of the air chamber defining means for the capacitor of FIG. 6.

The capacitor 70 is characterized by air chamber defining means 86 in the form of an air-filled polymer envelope shown in FIG. 7 providing a confined, compressible volume of air 88 within the housing, isolated from the capacitor 70. The capacitor is filled with fluid 26 which substantially fully immerses the capacitive element 18 with the volume air 88 segregated from the fluid and capacitive element, and displacing the fluid to achieve the substantial immersion of the capacitive element.

Upon an over pressure condition within the housing 71 of capacitor 70, the initial pressure increase will be absorbed and cushioned by collapsing and compressing the polymer envelope 86 and the air 88 confined therein. Thereafter the cover 74 will bow outwardly to break the electrical lead 80 between the terminals and the capacitive element 18, disconnecting the capacitive element from at least one terminal. The volume of air 88 is compressed to perform a cushioning function, in much the same way that the air space of prior art capacitors performed that function, but without the disadvantage of leaving a portion of the capacitive element uncovered by insulating fluid prior to failure of the capacitive element.

Figure 8:
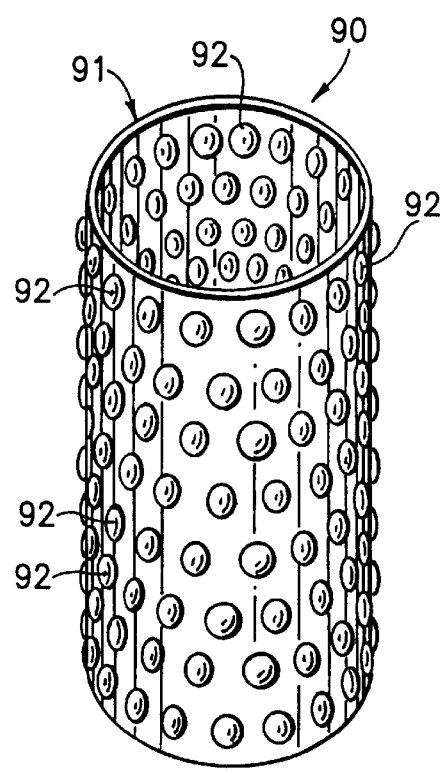
FIG. 8 is a perspective view of an alternative air chamber defining means for the capacitors of FIGS. 2 or 6.

Other forms of compressible air chambers are also contemplated, and as an example reference is made to FIG. 8 showing a tubular collapsible air chamber defining means 90 for a fluid-filled capacitor. The collapsible air chamber defining means 90 is a flexible polymer sheet 91 of bubble wrap having a plurality of confined air volume bubbles 92, the sheet 91 being formed in a generally cylindrical or tubular configuration for placing in a capacitor housing surrounding a capacitive element of the type described above.

It will also be appreciated that the benefit of the invention is realized generally by providing a volume of air in a capacitor housing which is not in contact with the capacitive element, and is confined such that the air may be compressed upon an over pressure condition in the housing. Rather than the air chamber defining means containing the air being collapsed as the air is compressed, the air chamber defining means may be adapted to admit fluid to compress the air therein.

Figure 9:
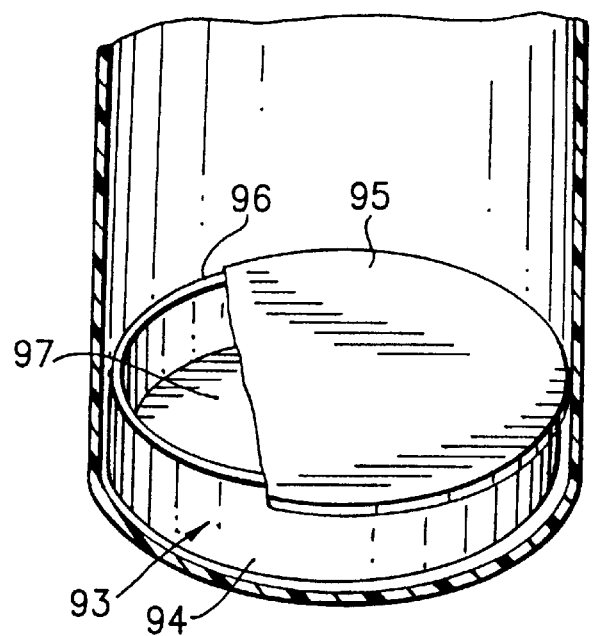
FIG. 9 is a perspective view of another alternative air chamber defining for the capacitors of FIGS. 2 or 6.

One such an air chamber defining means 93 is illustrated in FIG. 9, wherein a cylindrical cup 94 has a rupturable top seal 95 secured to the rim 96 thereof, confining a volume of air 97. The air chamber defining means 93 is placed in the capacitor 10 of FIGS. 2–5 in place of the piston, or in capacitor 70 in place of the envelope style air chamber 86. Upon an over pressure condition, the top seal 95 ruptures and the volume of air 97 is available for compression to cushion the shock of the over pressure condition. The air 97 may be released from the air chamber defining means 93 at that point, but still serves as a compressible volume of air in the housing of the capacitor.

Figure 10:
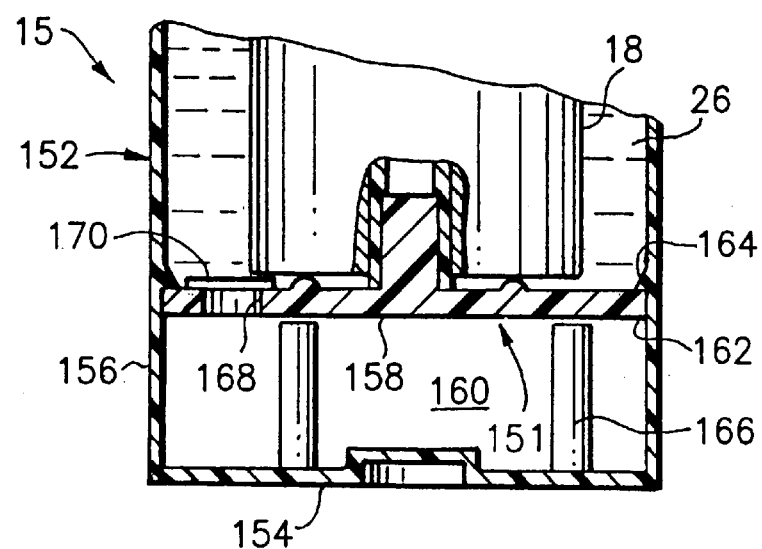
FIG. 10 is a fragmentary sectional view of another capacitor according to the invention herein, showing its air chamber defining means.

Another capacitor 150 with a further air chamber defining means 151 is illustrated in FIG. 10. The capacitor 150 has a case 152 with a bottom 154 and a cylindrical side wall 156. A cross wall 158 is spaced from the bottom 154 to case 152, and together with the bottom 154 and the adjacent portions of the side wall 156 form the air chamber defining means 151 confining a volume of air 160. The cross-wall 158 is secured in the case 152 by snap engagement of its periphery 162 under flange 164 formed in the side wall 156, and is supported spaced from the bottom 154 by ribs 166 also formed in the side wall 156. The capacitive element 18 is supported above the cross-wall 158 immersed in fluid 26, and the other structure of the capacitor 150 may be the same as or similar to capacitor 10.

The cross-wall 158 defines an opening 168 covered by a membrane seal 170. Upon the initiation of a high pressure condition in capacitor 150, the membrane seal 170 either ruptures or is pushed through the opening 168, so that the air 160 may be compressed to cushion the high pressure prior to operation of the pressure responsive interrupter system associated with capacitor 150.

Accordingly, fluid-filled capacitors having a compressible volume of air confined by air chamber defining means have been described which admirably achieve the objects of the invention herein. It will be appreciated that various changes and modifications may be made from the preferred embodiments described above, which are illustrative only, without departing from the spirit and scope of the invention, which is limited only by the following claims.

We claim:

1. A capacitor comprising:
    A) a housing having a case and a cover, the having terminals thereon for connecting the capacitor in an electrical circuit;
    B) a capacitive element received in the housing and connected with the terminals;
    C) pressure responsive interrupter means associated with the cover and the terminals for breaking the connection between the capacitive element and the terminals upon occurrence of a high pressure condition in the housing;
    D) air chamber defining means providing a confined compressible volume or air in the housing; and
    E) an insulating fluid substantially immersing the capacitive element within the housing.

2. A capacitor as defined in claim 1, wherein the housing is fabricated of a polymer.

3. A capacitor as defined in claim 2, wherein the housing is fabricated of polyphenylene ether and polystyrene.

4. A capacitor as defined in claim 2, wherein the compressible volume of air occupies from about 10% to about 40% of the volume of the housing, excluding the volume occupied by the capacitive element.

5. A capacitor as defined in claim 4, wherein the compressible volume of air occupies from about 25% to about 30% of the volume of the housing, excluding the volume occupied by the capacitive element.

6. A capacitor as defined in claim 2, wherein the air chamber defining means is at least one flexible polymer sheet defining at least one air pocket.

7. A capacitor as defined in claim 1, wherein the air chamber defining means includes a piston slidably mounted in the case, the piston and the case together defining the air chamber, such that occurrence of the high pressure condition in the housing acts on and slides the piston to compress the compressible volume of air.

8. A capacitor as defined in claim 7, wherein the capacitive element is positioned in the case between the piston and the cover.

9. A capacitor as defined in claim 8, wherein the case has a bottom wall and a cylindrical sidewall upstanding therefrom, and the piston is spaced from the bottom wall thereof with the air chamber defined between the piston and the bottom wall.

10. A capacitor defined in claim 9 wherein the piston has a face plate and a skirt slidingly engaged with the cylindrical sidewall.

11. A capacitor as defined in claim 9, wherein the housing is fabricated of a polymer.

12. A capacitor as defined in claim 11, wherein the case is fabricated of polyphenylene ether and polystyrene.

13. A capacitor as defined in claim 9, wherein the compressible volume of air occupies from about 10% to about 40% of the volume of the housing, excluding the volume occupied by the capacitive element.

14. A capacitor as defined in claim 13, wherein the compressible volume of air occupies from about 25% to about 30% of the volume of the housing excluding the volume occupied by the capacitive element.

15. A capacitor as defined in claim 7, wherein the compressible volume of air occupies from about 10% to about 40% of the volume of the housing excluding the volume occupied by the capacitive element.

16. A capacitor as defined in claim 15, wherein the compressible volume of air occupies from about 25% to about 30% of the volume of the housing excluding the volume occupied by the capacitive element.

17. A capacitor as defined in claim 1, wherein the air chamber defining means is at least one flexible polymer sheet defining at least one air pocket.

18. A capacitor as defined in claim 17, wherein the at least one flexible polymer sheet defines a plurality of air pockets.

19. A capacitor as defined in claim 1, wherein the air chamber defining means is a substantially rigid cup having a rupturable entry seal, the cup and seal defining a compressible volume of air therein, and the seal adapted to rupture upon a high pressure condition in the housing.

20. A capacitor as defined in claim 1, wherein the air chamber defining means is an additional wall of the housing confining a volume of air therein, the wall defining an opening covered by a membrane adapted to expose the confined volume of air upon a high pressure condition in the housing.

21. A capacitor comprising:
A) a polymer housing having a case with a bottom wall and a cylindrical sidewall, a cover secured to close the case with a recessed central portion of the cover deformable outwardly with respect to the case upon a high pressure condition within the housing, a bracing plate positioned in the housing adjacent the cover, and at least two terminals mounted to the outwardly deformable central portion of the cover with respective at least first and second terminal posts extending through the bracing plate;
B) a piston slidingly received in the cylindrical sidewall of the case spaced from the bottom wall thereof to confine a volume of air between the piston and the bottom wall;
C) a cylindrical wound metallized film capacitive element positioned within the housing between the piston and the cover and connected by conductive leads to the first and second terminal posts adjacent the bracing plate for disconnection from at least one of the first and second terminal posts upon outward deformation of the cover; and
D) insulating fluid contained in the housing between the piston and the cover, the insulating fluid substantially immersing the capacitive element,
wherein the piston is slidable toward the bottom wall of the case, compressing air in the confined volume of air upon a high pressure condition within the housing prior to outward deformation of the central portion of the cover.

22. A capacitor as defined in claim 21, wherein the housing is fabricated of polyphenylene ether and polystyrene.

23. A capacitor as defined in claim 21, wherein the compressible volume of air occupies from about 10% to about 40% of the volume of the housing excluding the volume occupied by the capacitive element.

24. A capacitor as defined in claim 23, wherein the compressible volume of air occupies from about 25% to about 30% of the volume of the housing excluding the volume occupied by the capacitive element.

25. A capacitor as defined in claim 21, wherein the case has a length of about 4 inches, a diameter of about 2 inches, and the piston is spaced from the bottom wall by a distance in the range of about ¼ inch to about 1½ inches.

26. A capacitor comprising:
A) a polymer housing having a case with a bottom wall and a cylindrical side wall, a cover secured closed case with a central portion of the cover deformable outwardly with respect to the case upon a high pressure condition within the housing, and least one terminal mounted to the outwardly deformable central portion of the cover;
B) a cylindrical wound metallized film capacitive element received within the housing and connected by an conductive lead to the at least one terminal, the conductive lead being a nicked wire adapted to break upon outward deformation of a cover;
C) an air chamber defining means confining a compressible volume of air in the housing and;
D) insulating fluid substantially immersing the capacitive element within the housing,
wherein the volume of the air in the air chamber defining means is compressed upon a high pressure condition within the housing, prior to outward deformation of the cover.

27. A capacitor as defined in claim 26, wherein the compressible volume of air occupies from about 10% to about 40% of the volume of the housing excluding the volume occupied by the capacitive element.

28. A capacitor as defined in claim 26, wherein the air chamber defining means is a piston slidingly received in the side wall of the case and spaced from the bottom wall thereof to define the air chamber.

29. A capacitor as defined in claim 26, wherein the air chamber defining means is at least one flexible polymer sheet defining at least one air pocket.

30. A capacitor as defined in claim 26, wherein the air chamber defining means is a substantially rigid cup having a rupturable entry seal, and the seal is adapted to rupture upon a high pressure condition in the housing.

31. A capacitor as defined in claim 26, wherein the air chamber defining means is an additional wall of the housing confining a volume of air therein, the wall defining an opening covered by a membrane adapted to expose the confined volume of air upon a high pressure condition in the housing.

32. A capacitor comprising:
A) a housing having terminals thereon for connecting the capacitor in an electrical circuit;
B) a capacitive element received in the housing and connected with the terminals;

C) pressure responsive interrupter means associated with the housing and the terminals for breaking the connection between the capacitive element and the terminals upon a high pressure condition in the housing;

D) an insulating fluid within the housing; and

E) air chamber defining means providing a confined compressible volume or air in the housing segregated from the insulating fluid.

33. A capacitor as defined in claim 32, wherein the housing is fabricated of a polymer.

34. In a capacitor of the type having a housing, at least one terminal mounted on a cover of the housing, a capacitive element within the housing connected to the at least one terminal and a pressure responsive interrupter system mounted to the cover for breaking the connection between the capacitive element and the at least one terminal, and fluid within the housing, a method of facilitating operation of the pressure responsive interrupter system comprising the step of confining a compressible vloume of air in the housing independently of the pressure interrupter system.

35. The method as defined in claim 34, wherein the compressible volume of air displaces the fluid so that the capacitive element is substantially immersed in the fluid.

* * * * *

UNITED STATES PATENT AND TRADEMARK OFFICE
CERTIFICATE OF CORRECTION

PATENT NO. : 6,313,978 B1　　　　　　　　　　　　　　　　　　　　Page 1 of 1
DATED : November 6, 2001
INVENTOR(S) : Robert M. Stockman et al.

It is certified that error appears in the above-identified patent and that said Letters Patent is hereby corrected as shown below:

Column 6,
Line 14, delete "or."

Column 8,
Line 28, after "the" insert -- cover --.
Line 39, delete "or" and substitute therefore -- of --.

Column 9,
Line 50, delete "two" and substitute therefore -- first and second --.
Line 60, before "first," insert -- at least --.

Column 10,
Line 33, delete "a" and substitute therefore -- the --.

Column 11,
Line 7, delete "or" and substitute therefore -- of --.

Column 12,
Line 7, delete "vloume" and substitute therefore -- volume --.

Signed and Sealed this

Thirteenth Day of August, 2002

Attest:

JAMES E. ROGAN
Attesting Officer　　　Director of the United States Patent and Trademark Office